United States Patent
Grobbee et al.

(10) Patent No.: US 12,274,599 B2
(45) Date of Patent: Apr. 15, 2025

(54) BAR MANUFACTURING AND DENTURE REFERENCE AND REGISTRATION SYSTEM

(71) Applicant: Global Dental Science, LLC, Scottsdale, AZ (US)

(72) Inventors: Johannes Petrus Michael Grobbee, Tilburg (NL); Robert van der Meer, Rotterdam (NL)

(73) Assignee: Global Dental Science, LLC, Scottsdale, AZ (US)

( * ) Notice: Subject to any disclaimer, the term of this patent is extended or adjusted under 35 U.S.C. 154(b) by 138 days.

(21) Appl. No.: 15/998,670

(22) Filed: Aug. 16, 2018

(65) Prior Publication Data
US 2019/0053881 A1 Feb. 21, 2019

Related U.S. Application Data

(60) Provisional application No. 62/546,404, filed on Aug. 16, 2017.

(51) Int. Cl.
*A61C 8/00* (2006.01)
*A61C 13/00* (2006.01)
(Continued)

(52) U.S. Cl.
CPC .......... *A61C 8/0095* (2013.01); *A61C 8/0027* (2013.01); *A61C 8/0048* (2013.01);
(Continued)

(58) Field of Classification Search
CPC ... A61C 8/0027; A61C 8/0095; A61C 8/0048; A61C 13/01; A61C 13/0006;
(Continued)

(56) References Cited

U.S. PATENT DOCUMENTS 3,241,238 A * 3/1966 Kersten .............. A61C 13/0001
433/171
3,748,739 A * 7/1973 Thibert ................ A61C 13/275
433/173
(Continued)

FOREIGN PATENT DOCUMENTS

DE 102006023673 11/2007
EP 1798459 6/2007
(Continued)

OTHER PUBLICATIONS

U.S. Appl. No. 15/711,857—Non-Final Office Action dated May 15, 2019.
(Continued)

*Primary Examiner* — Edward Moran
*Assistant Examiner* — Matthew P Saunders
(74) *Attorney, Agent, or Firm* — Derrick Harvey

(57) ABSTRACT

An improved denture system is disclosed. An improved denture system has a support bar and a denture material blank. The denture material blank has an oversize cutout to secure the support bar. The support bar has oversized implant interfaces and optional oversized tooth abutments. After securing the support bar in the denture material blank the final shape and dimensions of the implant interfaces and optionally the final shape and dimensions of the tooth abutments will be machined. The denture system will result in an accurate reference and registration between the denture teeth and base and the implant interfaces.

10 Claims, 12 Drawing Sheets

(51) Int. Cl.
 *A61C 13/01* (2006.01)
 *A61C 13/225* (2006.01)
 *A61C 13/20* (2006.01)

(52) U.S. Cl.
 CPC .......... *A61C 8/005* (2013.01); *A61C 13/0004* (2013.01); *A61C 13/0006* (2013.01); *A61C 13/0022* (2013.01); *A61C 13/01* (2013.01); *A61C 13/225* (2013.01); *A61C 13/206* (2013.01)

(58) Field of Classification Search
 CPC . A61C 13/0004; A61C 8/005; A61C 13/0022; A61C 13/225; A61C 13/206; A61C 13/0001; A61C 13/08; A61C 13/087; A61C 13/09; A61C 13/10; A61C 13/1003; A61C 13/1009; A61C 13/1016
 USPC ........................................... 433/199.1, 201.1
 See application file for complete search history.

(56) References Cited

U.S. PATENT DOCUMENTS

| | | | | |
|---|---|---|---|---|
| 4,741,698 A * | 5/1988 | Andrews | ............ | A61C 8/0075 433/173 |
| 4,784,608 A * | 11/1988 | Mays | ............ | A61C 8/0048 433/172 |
| 5,674,070 A * | 10/1997 | Fortin | ............ | A61C 8/0048 433/172 |
| 5,885,078 A * | 3/1999 | Cagna | ............ | A61C 13/0003 433/172 |
| 6,116,070 A * | 9/2000 | Oshida | ............ | A61C 13/06 72/60 |
| 6,382,975 B1 * | 5/2002 | Poirier | ............ | A61C 1/084 433/213 |
| 7,234,940 B2 * | 6/2007 | Weissman | ............ | A61C 8/0048 433/168.1 |
| 8,100,692 B2 * | 1/2012 | Diangelo | ............ | A61C 8/0048 433/213 |
| 9,717,570 B2 | 8/2017 | Chung et al. | | |
| 9,775,688 B2 | 10/2017 | Herweg | | |
| 10,022,916 B2 | 7/2018 | Powell | | |
| 10,159,545 B2 | 12/2018 | Thome | | |
| 2002/0142265 A1 * | 10/2002 | Weissman | ............ | A61C 8/0089 433/173 |
| 2003/0211444 A1 * | 11/2003 | Andrews | ............ | A61C 13/275 433/172 |
| 2006/0223029 A1 * | 10/2006 | Berger | ............ | A61C 13/275 433/172 |
| 2007/0275352 A1 * | 11/2007 | Gubler | ............ | A61C 13/0004 433/201.1 |
| 2008/0206711 A1 * | 8/2008 | Morgan | ............ | A61C 13/0022 433/174 |
| 2009/0104585 A1 * | 4/2009 | Diangelo | ............ | A61C 8/0048 433/223 |
| 2009/0220916 A1 | 9/2009 | Fisker | | |
| 2009/0325125 A1 * | 12/2009 | DiAngelo | ............ | A61C 13/0004 433/173 |
| 2010/0291509 A1 * | 11/2010 | Berggren | ............ | A61C 13/0022 433/199.1 |
| 2013/0101962 A1 | 4/2013 | Howe | | |
| 2013/0149668 A1 * | 6/2013 | Chen | ............ | A61C 8/0075 433/174 |
| 2013/0216323 A1 | 8/2013 | Matthias et al. | | |
| 2014/0051037 A1 * | 2/2014 | Fisker | ............ | A61C 13/34 433/213 |
| 2014/0087327 A1 | 3/2014 | Noack | | |
| 2014/0255873 A1 * | 9/2014 | Bullis | ............ | A61C 8/0048 433/199.1 |
| 2014/0272796 A1 | 9/2014 | Grobbee | | |
| 2014/0343707 A1 * | 11/2014 | Sereno | ............ | G05B 19/182 700/97 |
| 2015/0064653 A1 * | 3/2015 | Grobbee | ............ | A61C 8/0095 433/199.1 |
| 2015/0182314 A1 | 7/2015 | Morales et al. | | |
| 2015/0251359 A1 | 9/2015 | Powell | | |
| 2016/0193016 A1 * | 7/2016 | Morgan | ............ | A61C 8/0071 433/201.1 |
| 2016/0270886 A1 * | 9/2016 | Schulter | ............ | A61C 13/34 |
| 2016/0317263 A9 | 11/2016 | Morales et al. | | |
| 2016/0331494 A1 * | 11/2016 | Morales | ............ | A61C 13/0004 |
| 2017/0056134 A1 * | 3/2017 | Cordonnier | ............ | A61C 8/0027 |
| 2017/0128161 A1 | 5/2017 | See et al. | | |
| 2017/0258558 A1 * | 9/2017 | Morgan | ............ | A61C 8/0048 |
| 2018/0140387 A1 * | 5/2018 | Richard | ............ | A61C 13/206 |
| 2018/0147032 A1 | 5/2018 | Keating | | |
| 2018/0257187 A1 | 9/2018 | Grobbee | | |
| 2019/0083205 A1 | 3/2019 | van der Meer | | |
| 2019/0254786 A1 | 8/2019 | Keating | | |
| 2020/0060794 A1 * | 2/2020 | Pappas | ............ | A61C 8/0048 |

FOREIGN PATENT DOCUMENTS

| | | | | |
|---|---|---|---|---|
| EP | 2403427 | | 1/2012 | |
| EP | 3216420 | | 9/2017 | |
| EP | 3284438 | | 2/2018 | |
| WO | WO-2008024063 A1 * | | 2/2008 | ........ A61C 13/0004 |
| WO | 2010094922 | | 8/2010 | |
| WO | WO-2013167903 A1 * | | 11/2013 | ........ A61C 13/0004 |

OTHER PUBLICATIONS

U.S. Appl. No. 15/711,857—Final Office Action dated Feb. 19, 2020.
U.S. Appl. No. 15/823,379; Non-Final Office Action dated Jan. 27, 2020.
European Search Report for application No. EP18189345 dated Jan. 16, 2019.

* cited by examiner

BAR MANUFACTURING AND DENTURE REFERENCE AND REGISTRATION SYSTEM

RELATED APPLICATIONS

This application claims priority from U.S. Provisional Application No. 62/546,404 filed on Aug. 16, 2017 and entitled "System and Manufacturing Methods for Positioning Support Bar in Denture Reference and Registration System," the entire contents of which are hereby fully incorporated herein.

FIELD OF INVENTION

The present invention relates to implant and bar-supported or bar-retained dentures. More particularly, the present invention relates to a bar manufacturing system and denture reference and registration system to integrate a bar in a CAD/CAM manufactured denture.

BACKGROUND OF THE INVENTION

In the field of dentures, a metal bar on implants is used to stabilize the denture in the mouth and to strengthen the denture structure to avoid its breakage.

In the traditional denture manufacturing process an impression is made of a patient's implants and edentulous or partially edentulous ridges. The impression is used to construct a plaster model of the patient's edentulous ridges and implants. A metal bar is manufactured to fit exactly on the plaster model, and to align with the patient's implants according to the implant analogs in the plaster model. The metal bar is installed on the plaster model and the denture structure is then built around the bar in wax. Artificial teeth are placed in the wax resulting in a complete wax up of the denture with the bar incorporated on top of a plaster model. Traditionally, the next step is to investment cast the wax into acrylic resin.

For example, with reference to FIGS. 1A and 1B, a prior art system 100 is illustrated. A plaster model 102 is made of a patient's dentition. A bar 104 is installed on the plaster model 102 via implant analog interfaces 106. Wax mockup 108 is molded by hand and is mechanically wrapped around the bar 104. Artificial teeth 110 are installed. To finalize the denture, the system 100 is processed using investment casting, thereby causing wax mockup 108 to be replaced with acrylic denture material.

More recently, dentures have been made using CAD/CAM technology, such as by milling or 3D printing. With CAD/CAM technology, the denture is made directly without using wax and plaster models, thus no plaster model having implant analogues is available to align and position the bar. Consequently, a cavity must be cut in the denture and the bar fitted into the cavity. However, the bar is often complex in shape and difficult to precisely and securely fit in the denture. For example, small discrepancies will occur if the full shape of the bar is used for reference and registration.

Furthermore, even if such a plaster model were made to assist with aligning and positioning the bar in the cavity, the fitting of the denture onto the bar is difficult and often imprecise because it is difficult to preserve the proper registration of the bar with respect to the denture while they are mated and the bar disconnected from the plaster model, particularly if the model impedes access to the cavity in the denture. Moreover, the production of such a model introduces unwanted delay and expense.

Thus, there exists a need for an improved manufacturing, reference and registration system to overcome small discrepancies in the position of the supporting bar in a denture made using CAD/CAM technology. There exists a need to eliminate the production of a plaster model to assist with the positioning of the bar in the denture cavity. There is further a need for a method of producing dentures using a bar reference system as described in US Pat. No. U.S. Pat. No. 9,055,993B2, for example.

SUMMARY OF THE INVENTION

In accordance with various aspects of the present invention, an improved bar manufacturing and denture reference and registration system is provided. In accordance with an exemplary embodiment, a denture support bar system comprising: a denture material blank further comprising at least one oversize cutout; a support bar comprising at least one oversized implant interfaces extending in a first direction from the support bar; the denture support bar system being capable of reference and registration to the milling device; the support bar further comprising at least one oversized tooth abutment extending in a second direction to the support bar; the system further comprising a filler material within the oversized cutout; wherein said denture material blank with the secured support bar correlates to the final shape and dimensions of at least one of the following: a final denture, a final implant interface and a final tooth abutment; wherein said at least one tooth abutment comprises one to fourteen tooth abutments; said at least one implant interfaces comprises one to ten implant interfaces; the support bar further comprising at least one tooth cut-out extending in a second direction to the support bar; the system further comprising a tooth portion applied to the at least one tooth cut-out; the system further comprising a tooth portion applied to the at least one tooth abutments; whereby the system enables a reference and registration relationship between the denture teeth and the implant interfaces.

In accordance with an exemplary embodiment of the invention, a method for providing positioning of a support bar within a denture system is provided, said method comprising removing an oversized cut-out of a support bar from a dental material blank, positioning at least one oversized implant interface to the support bar, optionally positioning to the support bar at least one oversized tooth abutments or tooth cut-outs to a side opposite of the at least one oversized implant interface, and securing the support bar to the denture material blank; the method further comprising the step of utilizing the secured support bar to machine at least one of the following to its final shape and dimensions of a final denture, a final implant interface and a final tooth abutment; wherein said at least one tooth abutment comprises one to fourteen tooth abutments; wherein said at least one implant interface comprises one to ten implant.

In accordance with an exemplary embodiment of the invention, a denture material blank comprising a support bar comprising a plurality of oversized implant interfaces extending a first direction, and optionally extending an direction opposite the first direction a plurality of tooth abutments or tooth cut-outs; an oversized cutout of the support bar in the blank; the support bar configured to rest in oversize cutout of the denture material blank; a filler material in the oversized cutout that secures the support bar to the denture material blank; the plurality of oversized implant interfaces being machined to final implant interfaces; the denture material blank further comprising a tooth portion affixed to the plurality of tooth abutments or the tooth cutout.

In one exemplary embodiment, remaining openings between the bar and the blank may be filled with denture resin or other filler materials. The denture material blank with the integrated bar may be placed into a milling device for processing or creation of artificial dental devices. The denture material blank may be used as reference for the bar and registration to the milling device. The oversized implant interfaces, and if applicable the oversized tooth abutments and screw holes may be milled to the exact size. Oversized implant interfaces and tooth abutments also be understood within the scope of invention to mean rough shaped without the final feature details.

In accordance with another exemplary embodiment, a denture material blank may be used as reference for the bar and registration to the milling device. The oversized implant interfaces, if applicable the oversized tooth abutments, the screw holes and the full denture may then be milled to the exact size.

In accordance with another exemplary embodiment, a denture material blank may be used as reference for the bar and registration to the milling device. The oversized implant interfaces, if applicable the oversized tooth abutments, the screw holes and the intaglio surface of the denture may then be milled to the exact size.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIGS. 5A-5C are views of an exemplary embodiment, according to FIGS. 4A-4C including tooth abutments, along with detailed views thereof;

DESCRIPTION OF THE EXEMPLARY EMBODIMENTS

Figure 1A:
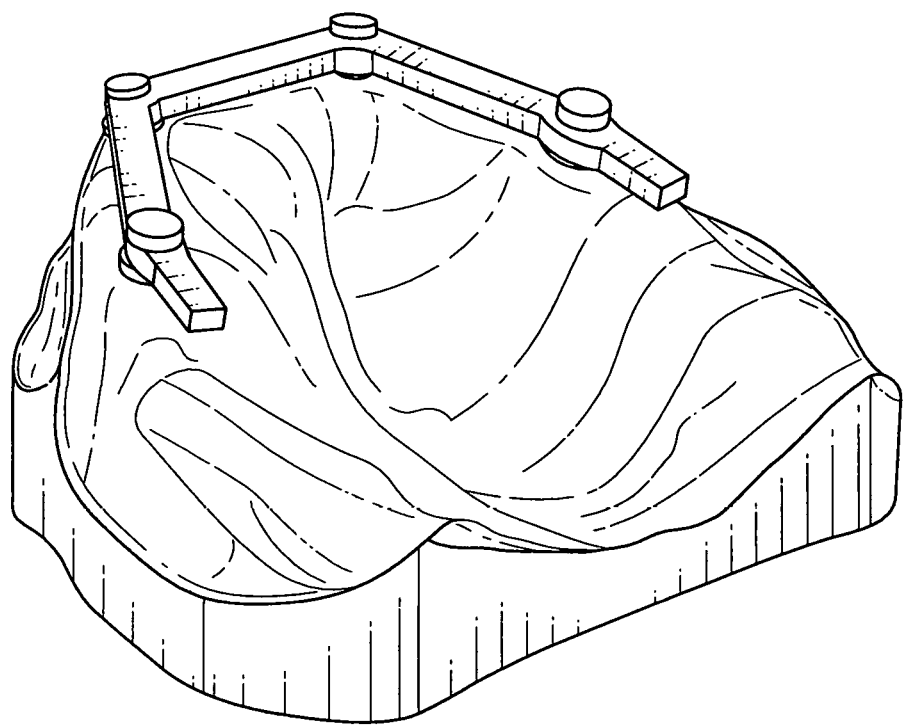
FIGS. 1A and 1B are views of a prior art system having a plaster model and a support bar.
Figure 1B:
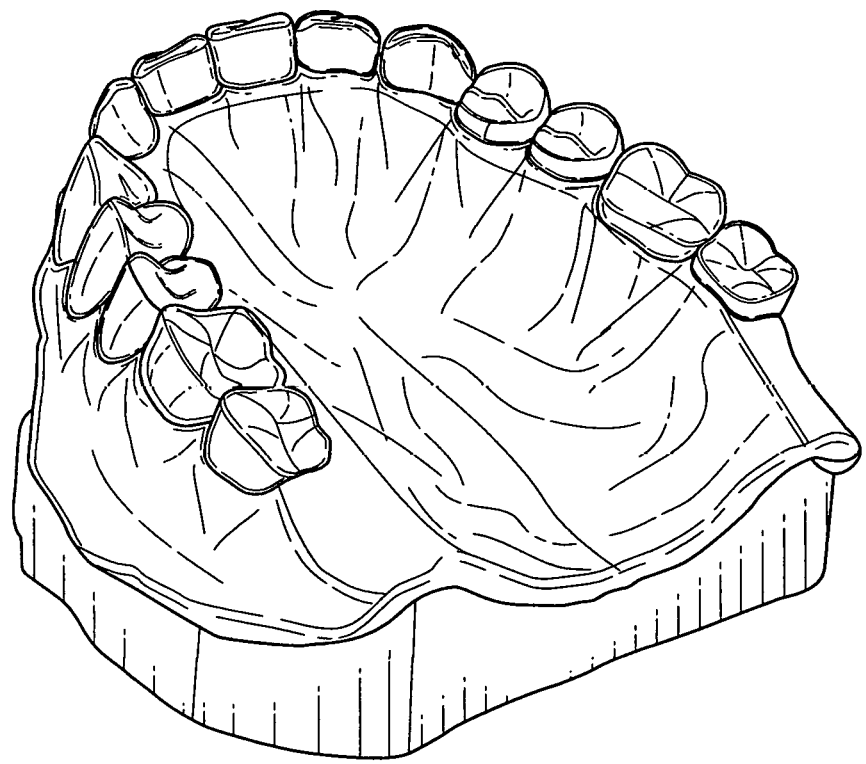

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for manufacturing and construction may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method of construction.

In accordance with various aspects of the present invention, an improved bar manufacturing and denture reference and registration system are provided. In accordance with an exemplary embodiment, a support bar comprising a plurality of implant interfaces may be inserted into an improved denture material blank having an oversize cutout, wherein the cutout is configured to interface with support bar, and as a result, securing the denture material blank with the support bar.

Securing the denture material blank, may in some example embodiments have multiple meanings or configurations. For example, "securing" can mean retaining the denture components, such as a denture system, a denture bar, or a denture material blank. Alternatively, "securing" may mean stabilizing the denture components, such as a denture system, a denture bar, or a denture material blank. Furthermore, "securing" may mean aligning the denture components, such as a denture system, a denture bar, or a denture material blank. Still furthermore, "securing" may mean reinforcing the denture or denture bar or denture material blank. In some embodiments "securing" may mean any combination of these meanings and configurations.

With reference to FIGS. 4A-4D, an improved denture system 400 is illustrated. Additionally, with reference to FIGS. 2A-2B, 3A-3B, 5A-5D, improved denture system 400 may comprise a support bar 202 and denture material blank 406. Support bar 202 may have a plurality of oversized implant interfaces 204. The denture material blank 406 may have at least one oversized cutout 402, or a void within the material blank whose space is larger than the support bar.

Support bar 202 may be placed in oversize cutout 402. Support bar 202 may be held in substantially fixed position, or is maintained, or otherwise coupled or retained in communication with the denture material blank 406 or to otherwise secure the denture material blank 406 or providing for easy positioning of the denture bar 202 relative to the denture material blank 406.

Figure 2A:
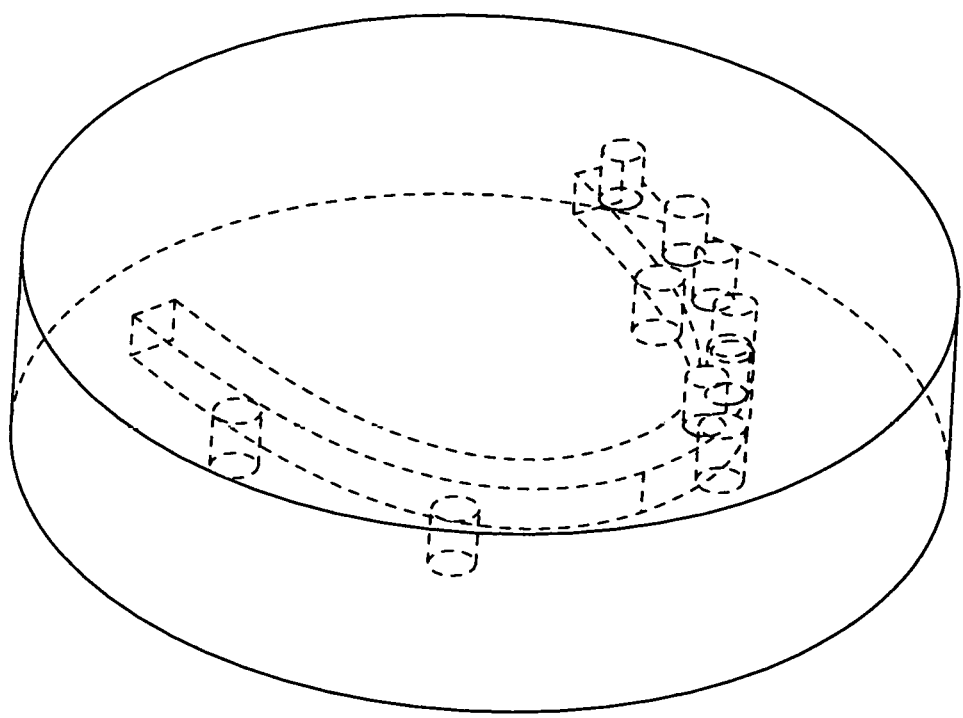
FIG. 2A is a view of an exemplary embodiment of a support bar positioned in a denture material blank
Figure 2B:
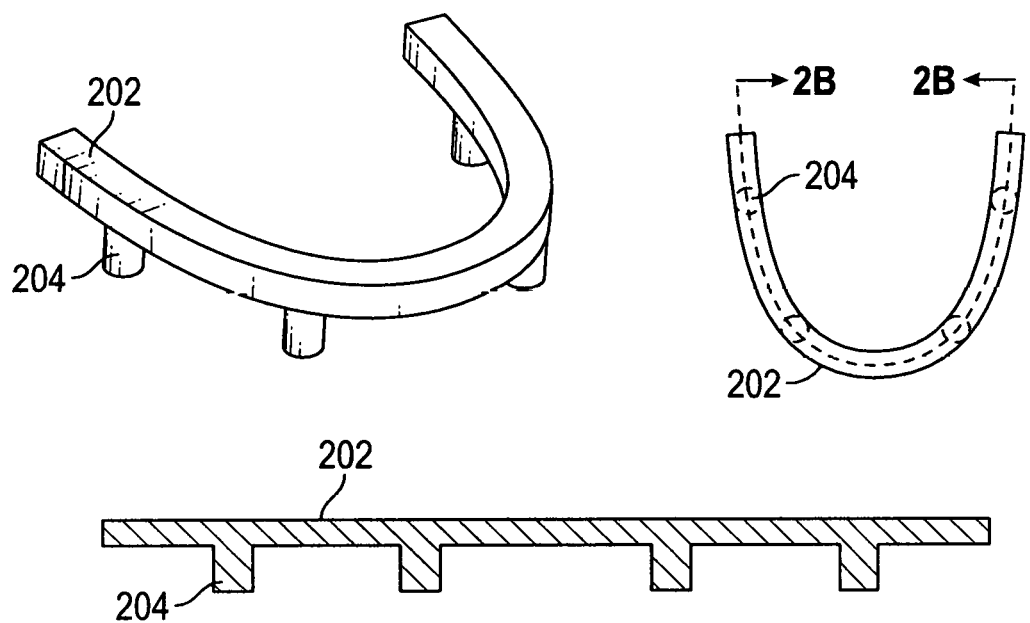
FIG. 2B is a panoramic view A-A of an exemplary embodiment of a support bar with oversized implant interfaces, according to FIG. 2A.
Figure 2C:
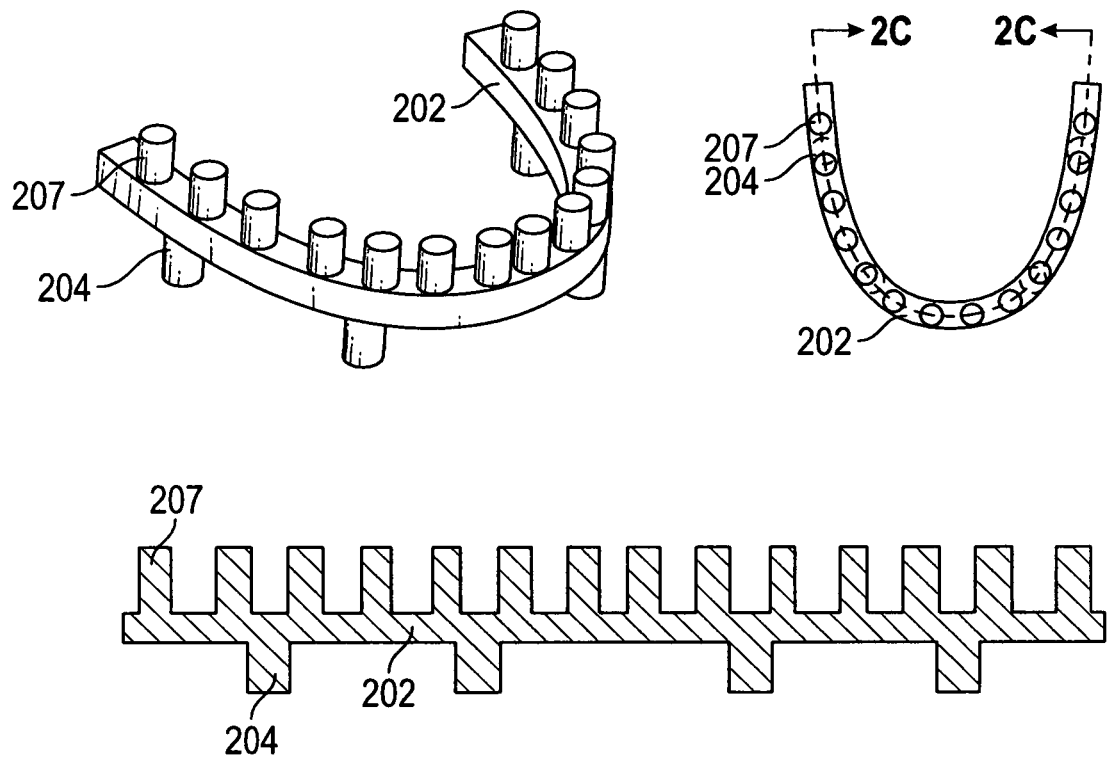
FIG. 2C is a panoramic view A-A of an exemplary embodiment of a support bar with oversized implant interfaces and oversized tooth abutments, according to FIG. 2A.
Figure 3A:
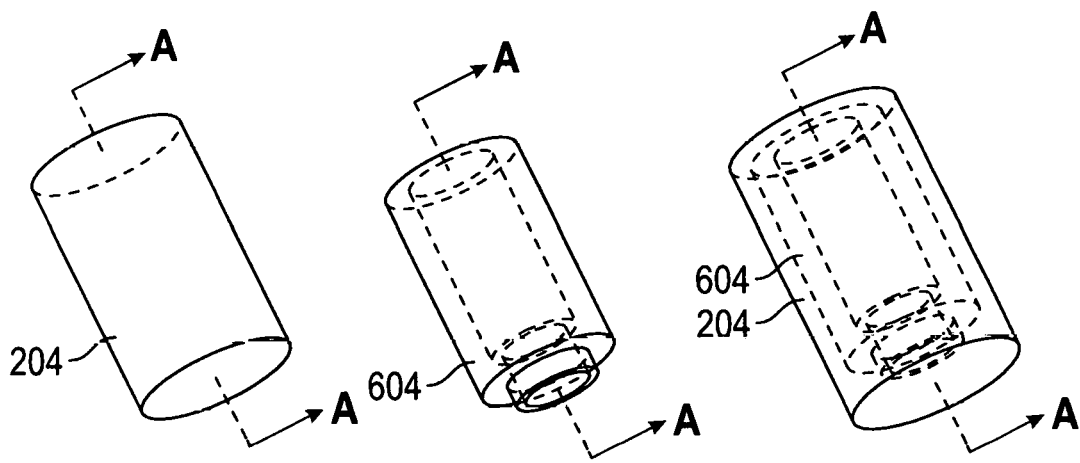
FIG. 3A is a view of a comparison between a final milled implant interface and an oversized implant interface.
Figure 3B:
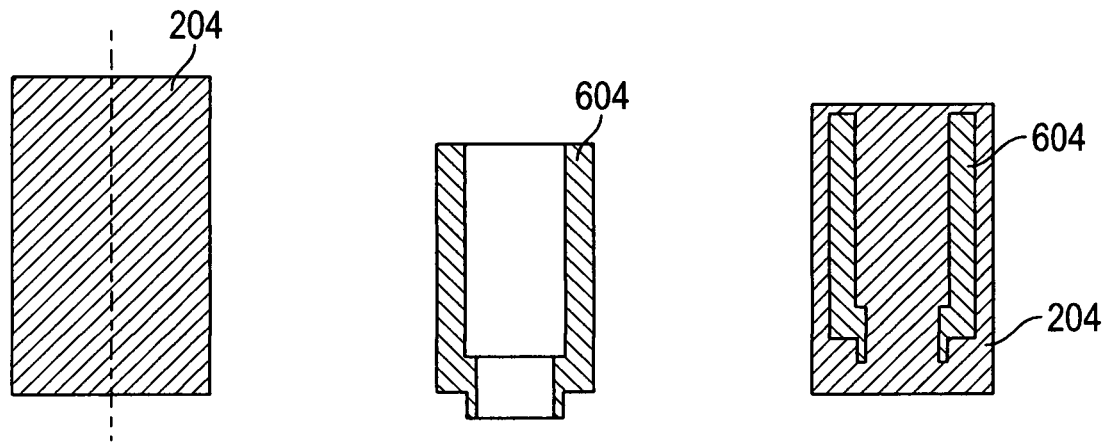
FIG. 3B is a section view A-A of a comparison between a final milled implant interface and an oversized implant interface, according to FIG. 3A.

With reference to FIGS. 2A-2C, a support bar 202 for use in an improved denture system 400 is illustrated. Support bar 202 may be made of joined or integrally manufactured segments to approximately follow the contour of a patient's edentulous ridges. Alternatively, support bar 202 may be segmented, or straight, or curved, or any other shape adapted to provide support to an improved denture system 400.

Support bar 202 may further comprise an oversized implant interface 204. In one exemplary embodiment, a support bar 202 may comprise four oversized implant interfaces 204. In another example embodiment, a support bar 202 may comprise six oversized implant interfaces 204, or five oversized implant interfaces 204, or three oversized implant interfaces 204, or two oversized implant interfaces 204, or one oversized implant interface 204. In one embodiment, support bar 202 comprises oversized implant interfaces 204 located at the joint of each segment of support bar 202. Alternatively, support bar 202 may comprise oversized implant interfaces 204 spaced evenly along support bar 202. Still further, alternatively, support bar 202 may comprise oversized implant interfaces 204 located at places corresponding to suitable sites along a patient's edentulous ridges for the installation of implants. Support bar 202 may comprise any number or configuration of implant interfaces 204 adapted to support an improved denture system 400.

Figure 6A:
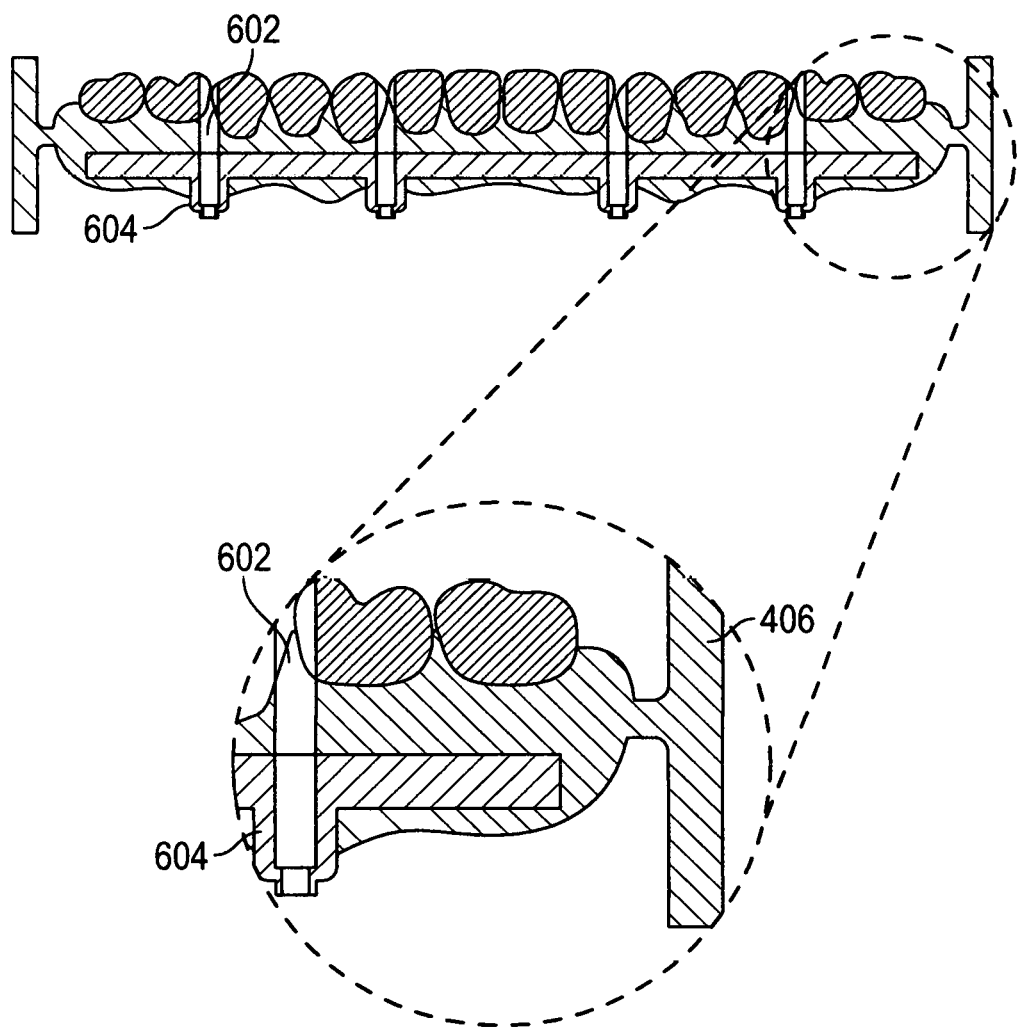
FIG. 6A is a panoramic view of an exemplary embodiment of a denture material blank with an integrated bar with a finished intaglio surface, finished implant interfaces milled to the exact dimensions and finished screw holes, along with a detailed view thereof.
Figure 6B:
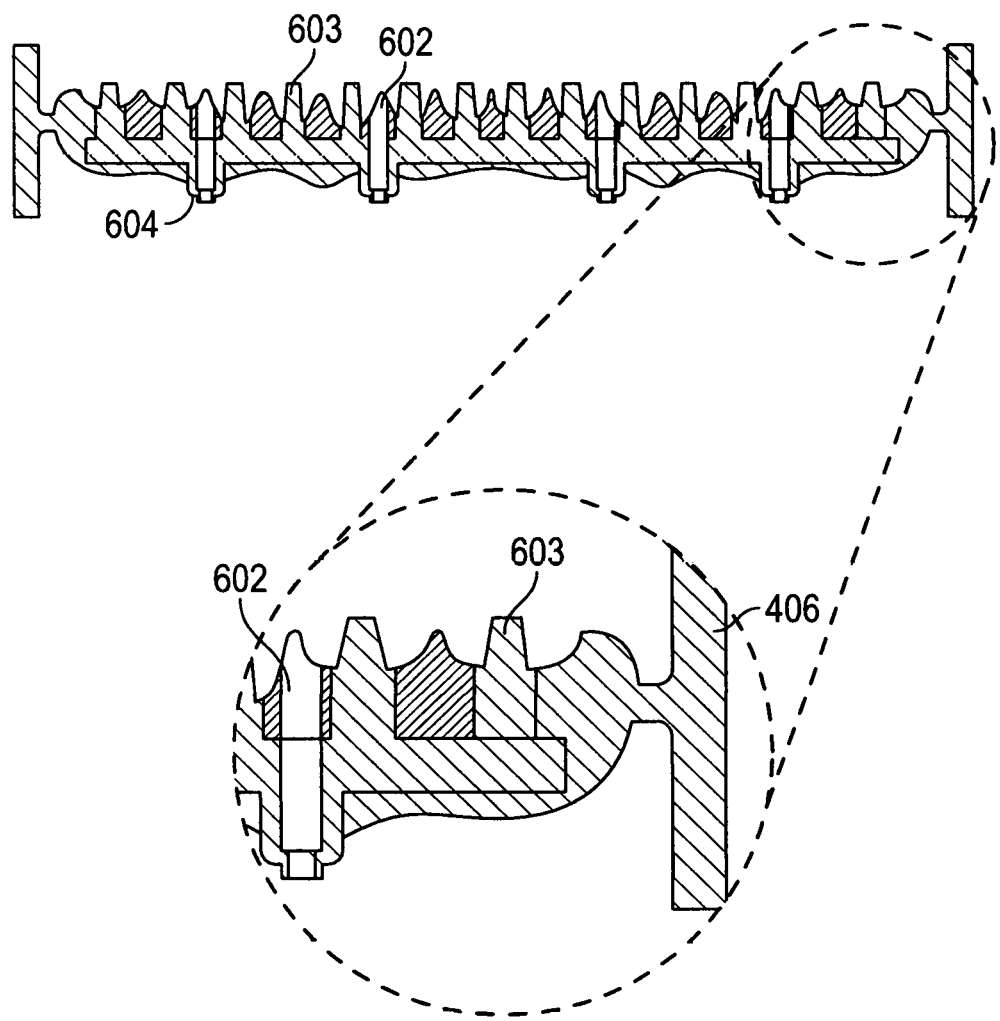
FIG. 6B is a panoramic view of an exemplary embodiment of a denture material blank with an integrated bar with a finished intaglio surface, finished implant interfaces milled to the exact dimensions, finished screw holes and finished tooth abutments, along with a detailed view thereof.
Figure 7:
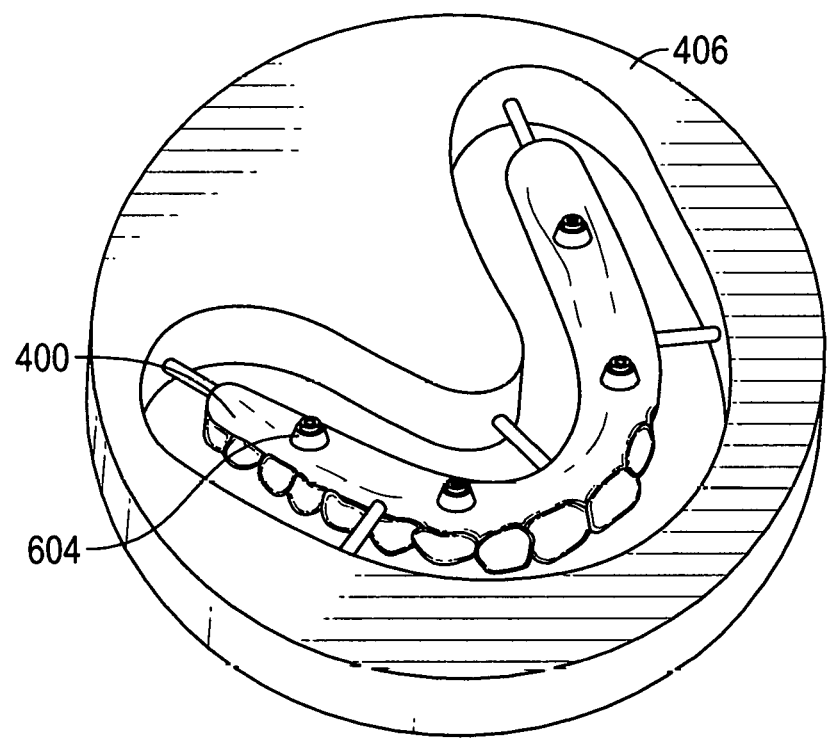
FIG. 7 is a view of an exemplary embodiment finished denture in a denture material blank with an integrated bar.

With reference to FIGS. 6A-6B oversized implant interface 204 may be machined into an accurate final implant interface 604. With momentary reference to FIGS. 6A-6B, generally, final implant interface 604 comprises holes for insertion of fasteners 602 whereby support bar 202 may be secured to a patient's implants. Alternatively, final implant interface 604 may comprise captive bolds, threaded holes, captive nuts, or any other fastening mechanism. In another embodiment of the invention, the intaglio surface of the denture structure may also be milled to a final specification in the same step as the milling of the final implant interface, so that when the bar is secured to the patient's implants, the intaglio surface of the denture structure is already completed. Other sequencing of steps described herein may be available in other embodiments of the invention not illustrated.

Furthermore, in FIG. 6B are the optional oversized tooth abutments 207 machines to an accurate sized and shaped tooth abutment 603.

Support bar 202 may also comprise a plurality of oversized tooth abutments 207. In one exemplary embodiment, each oversized tooth abutment 207 will extend into a corresponding cutout 402. For example, with momentary reference to FIGS. 5A-5B a corresponding cutout 402 in the denture material blank 406. The oversized tooth abutments 207 and the oversized implant interfaces 206 will typically be manufactured in one piece with the support bar 202, for example by machining, 3D printing or other technologies known in the dental arts to produce such devices. Other approaches to manufacturing the abutments and implant interfaces with the support bar, in segments or other piecemeal construction techniques, are well-within the scope of the invention.

Oversized implant interfaces 206 may be any size or shape adapted to the support bar 202.

Various materials may be used to manufacture support bar 202. In one exemplary embodiment, support bar 202 may comprise metal, such as titanium, aluminum or stainless steel, though it may alternatively comprise numerous other materials configured to provide support, such as, for example, carbon fiber, a Kevlar-brand material, Dynema-brand material, Aramid-brand material, alloy, glass, binder, epoxy, polyester, acrylic, or any material or combination of materials having a desired strength, stiffness, or flexibility sufficient to reinforce said denture. In one example embodiment, oversized implant interfaces 206 are made of different material than support bar 202. For example, a support bar 202 may be titanium and oversized implant interface 206 may be zirconia. In another embodiment, the oversized implant interfaces 206 may be manufactured separately from the support bar 202 and are utilized in conjunction with the support bar 202 according to the principles described herein.

In some embodiments, a support bar 202 may comprise multiple materials, or any material configuration suitable to enhance or reinforce the resiliency and/or support of the denture when subjected to wear in a wearer's mouth or to satisfy other desired chemical, physical, or biological properties. Furthermore, a support bar 202 may comprise materials with differing grain structures or grain direction or with similar grain structures or grain direction or any grain structure or direction suitable for achieving desired properties in the denture; for example, resiliency under torsional loads.

Now, having described various components of an improved denture system 400, the assembly of an improved denture system 400 may be appreciated with reference to FIGS. 6A-6B.

The oversize cutout 402 may be made in denture material blank 406 by milling, or molding, or 3D printing, or any other method for making an improved denture. For example, the oversize cutout 402 may be machined by a CAD/CAM machining device, although any process suited for accurate forming of the material may be utilized. For example, said oversize cutout 402 may be formed by machining, etching, waterjet, laser cutting, 3D printing, or chemical mask processes.

Turning to FIGS. 6A-6C, the process for manufacturing an improved denture system 400 continues with the securing the bar 202 into oversize cutout 402. In one embodiment, a second material (FIG. 4B, 403) may be filled into any remaining voids in oversize cutout by use of high pressure injection or other techniques known in the arts to inject fluids or materials into such remaining voids.

Figure 4A:
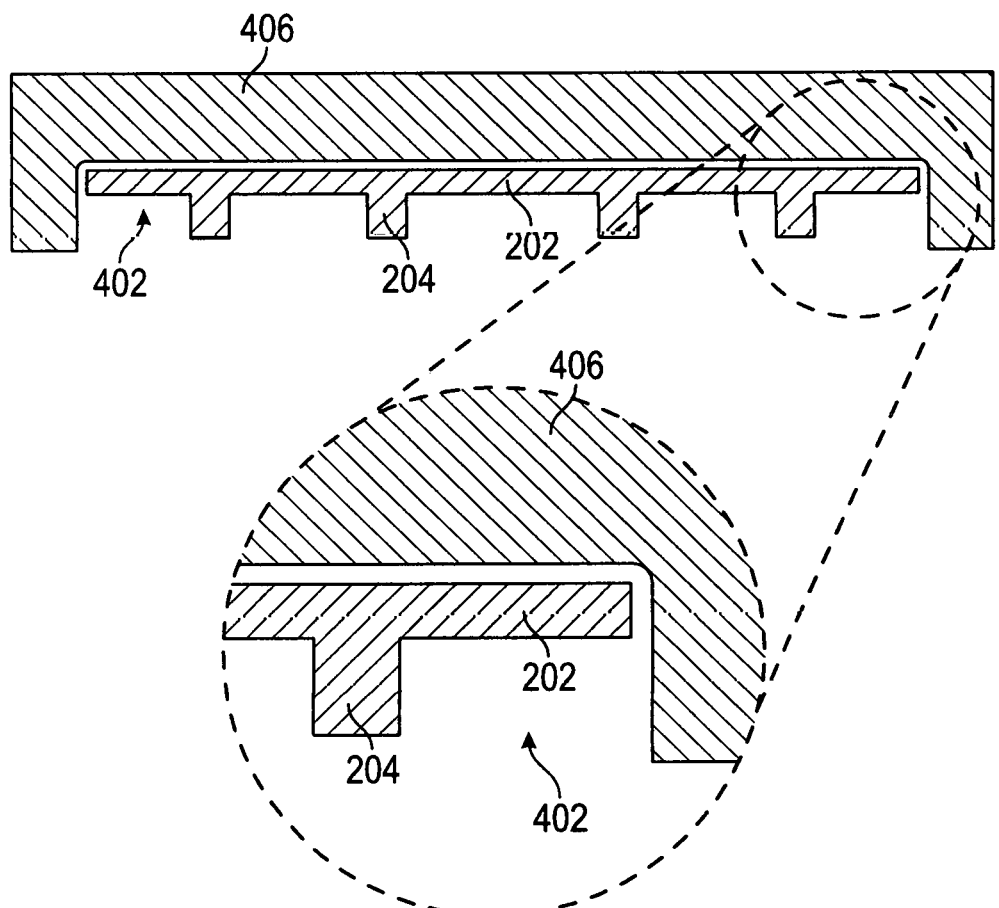
FIG. 4A is a panoramic view of an exemplary embodiment of a bar with oversized implant interfaces positioned into a cutout in a denture material blank, along with a detailed view thereof a portion of the bar, blank and cutout.
Figure 4B:
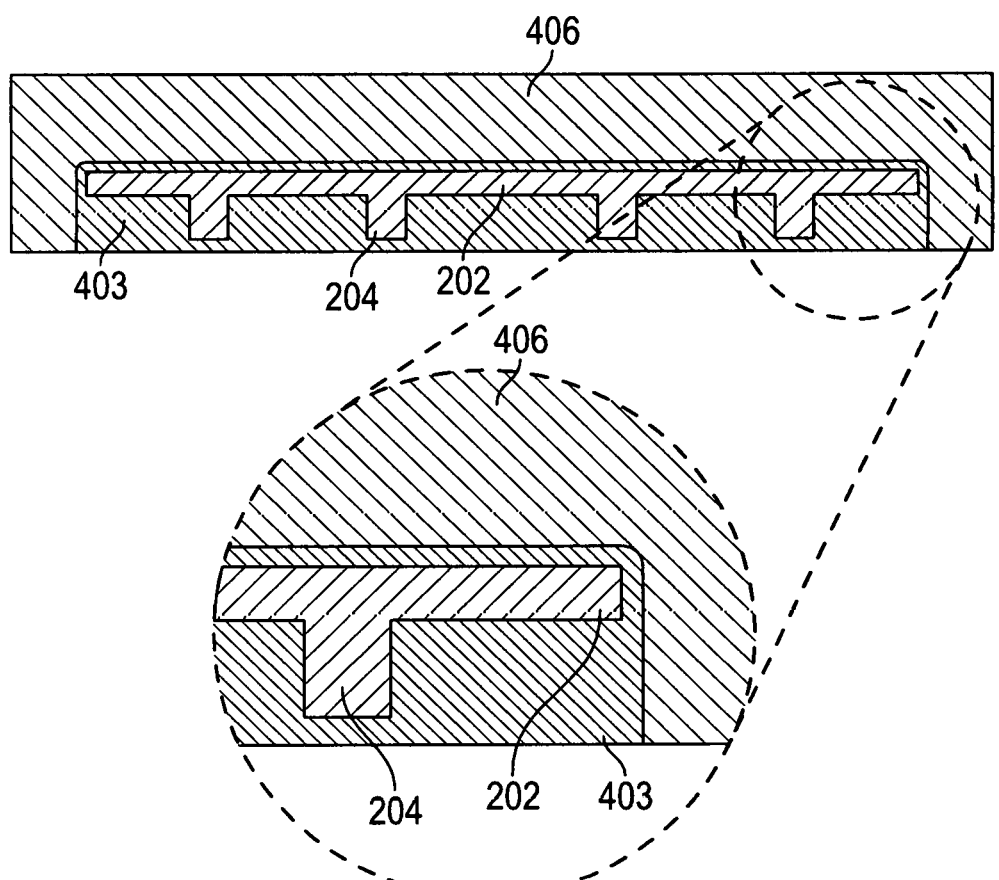
FIG. 4B is a panoramic view of an exemplary embodiment of a bar with oversized implant interfaces according to FIG. 4A integrated in a denture material blank with the cutout filled with denture material resin, along with a detailed view thereof a portion of the bar, blank and filled cutout filled with resin.
Figure 4C:
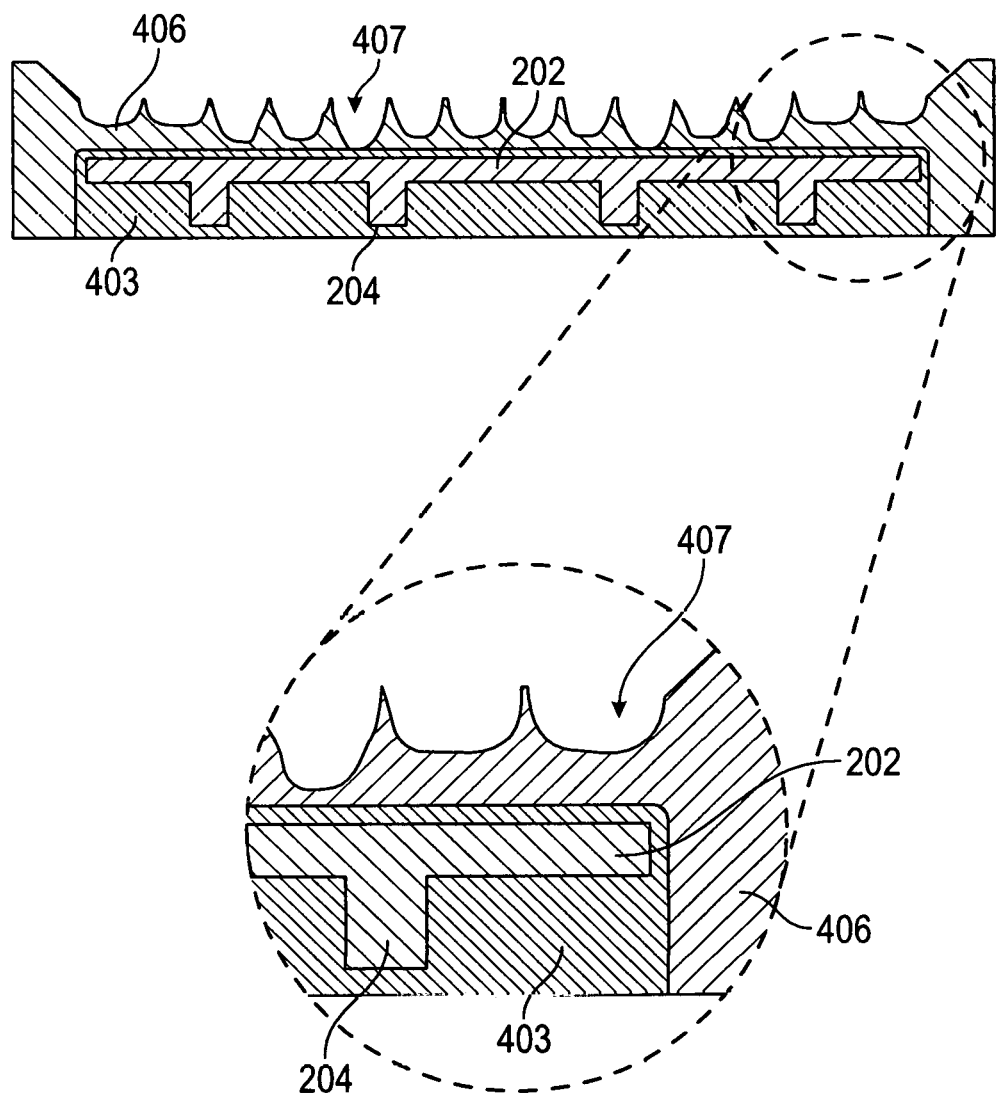
FIG. 4C panoramic view of an exemplary embodiment of a bar with oversized implant interfaces according to FIG. 4A integrated in a denture material blank with the cutout filled with denture material resin, further having tooth root structures cut into the top of the material blank.
Figure 4D:
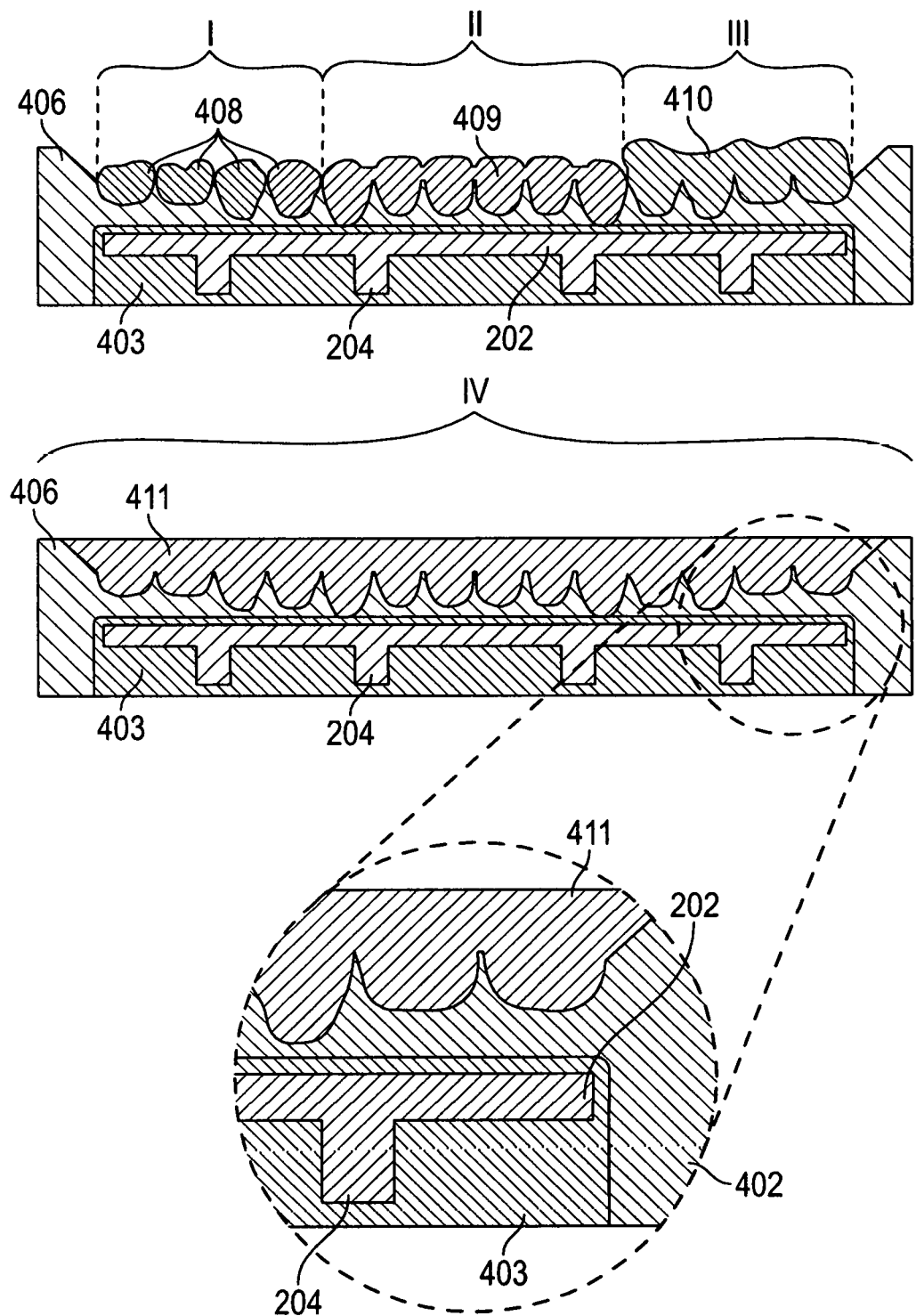
FIG. 4D is panoramic view of an exemplary embodiment of a bar with oversized implant interfaces according to FIG. 4A integrated in a denture material blank with first cutout filled with denture material resin, the material blank having a second cutout at the top of the material blank.
Figure 5A:
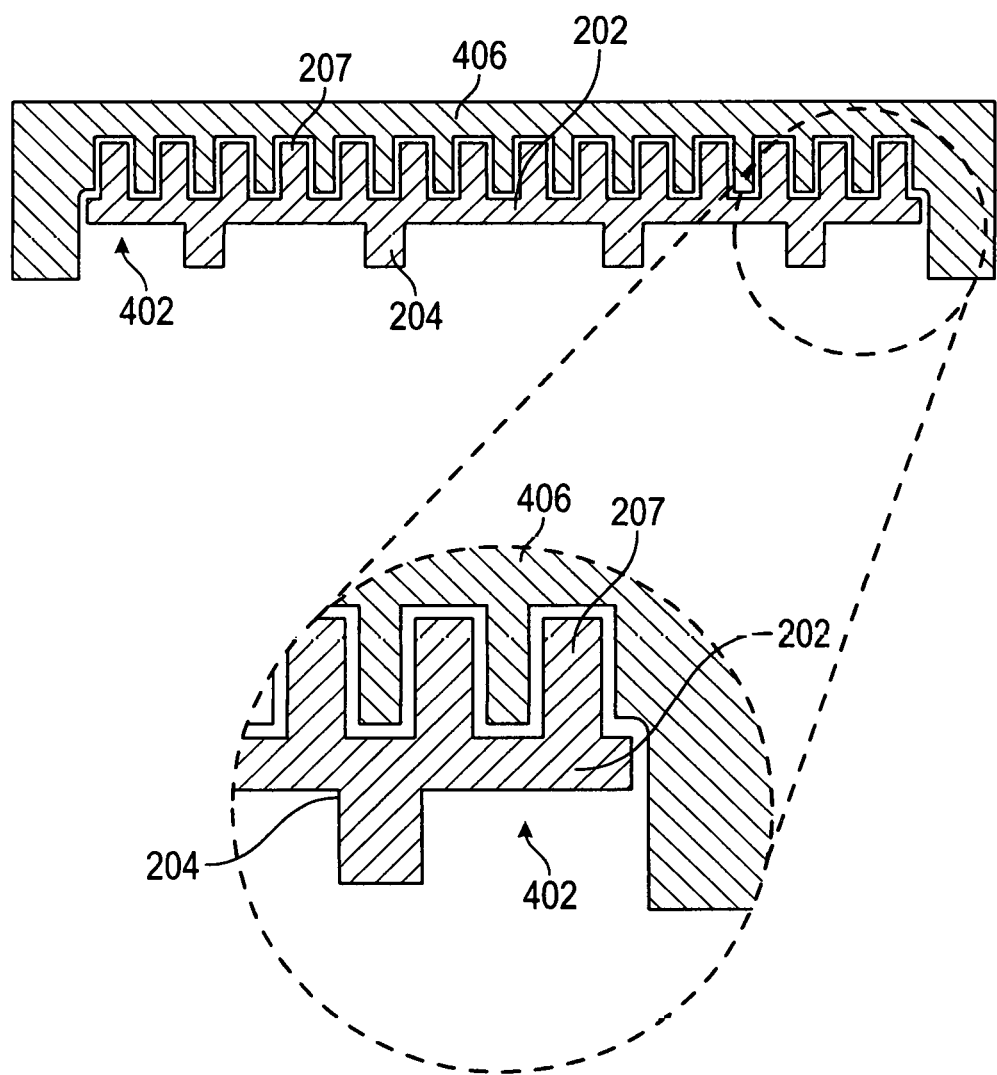
Figure 5B:
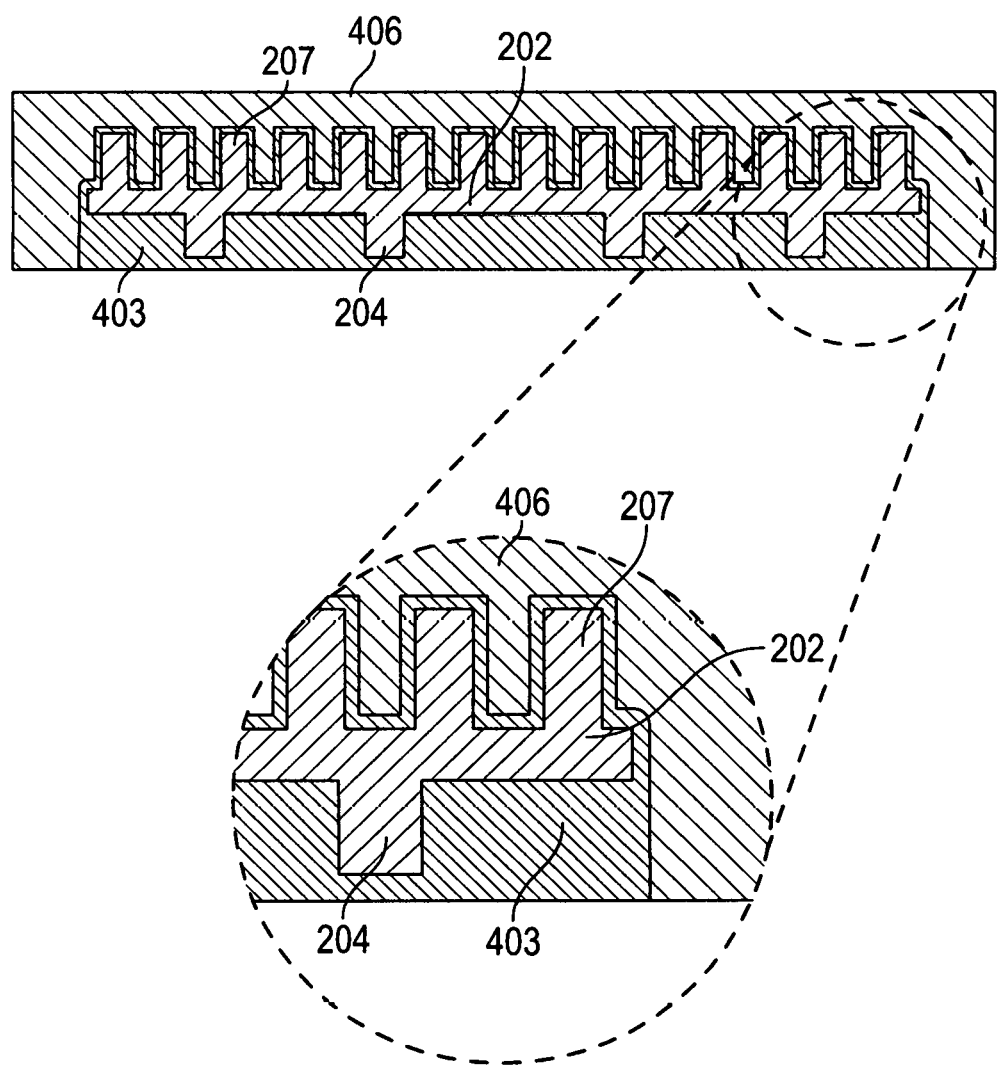

In an exemplary embodiment of the invention, the denture system illustrated in FIG. 6a may be manufactured through a number of different processes beginning with the intermediate denture product in 4b. For instance, FIG. 4c shows a version of the intermediate denture product in 4b, with tooth pockets or tooth cut-outs 407 having been cut from the material blank 406, or with such blank material 406 being removed from the denture product to form tooth pockets or at least one tooth cut-out 407. Similarly, the embodiment in FIG. 4d illustrates the intermediate denture product from 4b, but with a second cut-out applied at the top (or side opposite that of the first cut-out) of the material blank. In this embodiment, a tooth portion 411 may be applied to the second cut-out by way of adhesive, friction fit, locking mechanism, or other means of mating known in the dental arts. By way of specific example and not limitation, a dental practitioner may glue the tooth portion comprising PMMA directly into the second cut-out. Tooth portion is shown as being an integral piece adhered to the second cut-out, but tooth portion may also comprise sub-sections 408, 409 and 410 of the tooth portion.

The various components of an improved denture system 400 may be made of various different materials in different shapes. For example, various materials may be used to the denture material blank 406. In one exemplary embodiment, a hardened polymethyl methacrylate (PMMA) material is used. However, the denture material blank 406 may comprise any material having sufficiently low porosity so as to be hygienic for extended placement in a wearer's mouth. For example, the denture material blank may be made of a plastic, ceramic, metal, or acrylic, including for instance, a polymer, monomer, composite, or alloy.

In various embodiments of the invention, the dental blank material may comprise a single tooth material, with layered tooth materials, and/or the blank comprising the denture base material.

Furthermore, the shape of the denture material blank 406 can be oval, or multisided, for example trapezoidal, heptagonal, hexagonal, septagonal, or octagonal or any other number of sides, or may be irregularly shaped, or may be T-shaped, L-shaped or horseshoe shaped or may comprise any other shape.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "proximate," "proximately," or any other variation thereof, are intended to cover a physical connection, an electrical connection, a magnetic connection, an optical connection, a communicative connection, a functional connection, and/or any other connection. When language similar to "at least one of A, B, or C" is used, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The invention claimed is:

1. A denture material blank having a top surface correlating to a coronal portion of a denture and a bottom surface correlating to an implant interfacing portion of a denture, with one of the top surface or bottom surface having a flat profile, the denture material blank comprising:

a support bar within the denture material blank and the support bar at least partially comprising a material different than that of the denture material blank, the support bar further comprising two or more solid cylindrical shapes capable of being milled into a smaller volume, the two or more solid cylindrical shapes capable of being milled into a smaller volume extending in a first direction towards the bottom surface from the support bar, the two or more solid cylindrical shapes each extending in the first direction toward an end, the two or more solid cylindrical shapes being integrated within the denture material blank and an added denture material at least up to the end of each of the two or more solid cylindrical shapes.

2. The denture material blank according to claim 1, the support bar further comprising at least one oversized tooth abutment extending in a second direction towards the top surface from the support bar.

3. The denture material blank according to claim 1, whereby the denture material blank enables a known reference for the support bar to be capable of reference and registration to a milling device allowing for milling of the support bar within the denture material blank.

4. The denture material blank according to claim 2 capable of being further processed into at least one of the following:

a final denture;

a final implant interface;

and a final tooth abutment.

5. The denture material blank according to claim 2 wherein said at least one oversized tooth abutment comprises one to fourteen tooth abutments.

6. The denture material blank according to claim 1 wherein said two or more solid cylindrical shapes comprises two to ten solid cylindrical shapes.

7. The denture material blank according to claim 1, the denture material blank further comprising at least one tooth cut-out extending in a second direction towards the top surface from the support bar.

8. The denture material blank according to claim 7 further comprising a tooth portion applied to the at least one tooth cut-out.

9. The denture material blank according to claim 2 further comprising a tooth portion applied to the at least one tooth abutments.

10. The denture material blank according to claim 4 whereby the system enables a reference and registration relationship between a final tooth portion and the final implant interface.

* * * * *